(12) United States Patent
Souden et al.

(10) Patent No.: US 11,514,928 B2
(45) Date of Patent: Nov. 29, 2022

(54) SPATIALLY INFORMED AUDIO SIGNAL PROCESSING FOR USER SPEECH

(71) Applicant: Apple Inc., Cupertino, CA (US)

(72) Inventors: Mehrez Souden, Los Angeles, CA (US); Ante Jukic, Los Angeles, CA (US); Jason Wung, Cupertino, CA (US); Ashrith Deshpande, San Jose, CA (US); Joshua D. Atkins, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 16/708,296

(22) Filed: Dec. 9, 2019

(65) Prior Publication Data

US 2021/0074316 A1 Mar. 11, 2021

Related U.S. Application Data

(60) Provisional application No. 62/897,920, filed on Sep. 9, 2019.

(51) Int. Cl.
*G10L 25/78* (2013.01)
*G10L 25/81* (2013.01)
*G10L 25/18* (2013.01)
*G10L 21/0232* (2013.01)
*G10L 15/22* (2006.01)
*G06N 7/00* (2006.01)
*G06N 20/00* (2019.01)
(Continued)

(52) U.S. Cl.
CPC .............. *G10L 25/81* (2013.01); *G06N 7/005* (2013.01); *G06N 20/00* (2019.01); *G06V 40/171* (2022.01); *G10L 15/22* (2013.01); *G10L 15/25* (2013.01); *G10L 21/0232* (2013.01); *G10L 25/18* (2013.01); *G10L 17/00* (2013.01); *G10L 25/78* (2013.01); *G10L 2021/02082* (2013.01); *G10L 2021/02166* (2013.01)

(58) Field of Classification Search
CPC ......... G10L 25/30; G10L 25/78; G10L 25/84; G10L 17/00; G10L 2021/02166; G01S 3/8006
See application file for complete search history.

(56) References Cited

U.S. PATENT DOCUMENTS

2006/0072766 A1\* 4/2006 Klein .................... H04M 9/082
379/406.01
2011/0158418 A1\* 6/2011 Bai .......................... H04B 3/23
381/66
(Continued)

FOREIGN PATENT DOCUMENTS

EP 1580730 B1 \* 9/2008 ......... G10L 21/0208

*Primary Examiner* — Feng-Tzer Tzeng
(74) *Attorney, Agent, or Firm* — Bakerhostetler

(57) ABSTRACT

A device implementing a system for processing speech in an audio signal includes at least one processor configured to receive an audio signal corresponding to at least one microphone of a device, and to determine, using a first model, a first probability that a speech source is present in the audio signal. The at least one processor is further configured to determine, using a second model, a second probability that an estimated location of a source of the audio signal corresponds to an expected position of a user of the device, and to determine a likelihood that the audio signal corresponds to the user of the device based on the first and second probabilities.

20 Claims, 8 Drawing Sheets

(51) Int. Cl.
*G10L 15/25* (2013.01)
*G06V 40/16* (2022.01)
G10L 21/0208 (2013.01)
G10L 21/0216 (2013.01)
G10L 17/00 (2013.01)

(56) References Cited

U.S. PATENT DOCUMENTS

| | | | | |
|---|---|---|---|---|
| 2011/0317522 | A1* | 12/2011 | Florencio | G01S 3/8006 367/129 |
| 2012/0078624 | A1* | 3/2012 | Yook | G10L 25/78 704/E17.001 |
| 2014/0313230 | A1* | 10/2014 | Suggs | G06F 3/013 345/648 |
| 2015/0279103 | A1* | 10/2015 | Naegle | G01S 13/48 345/633 |

* cited by examiner

SPATIALLY INFORMED AUDIO SIGNAL PROCESSING FOR USER SPEECH

CROSS REFERENCE TO RELATED APPLICATIONS

This application claims the benefit of priority to U.S. Provisional Patent Application No. 62/897,920, entitled "Spatially Informed Audio Signal Processing for User Speech," and filed on Sep. 9, 2019, the disclosure of which is hereby incorporated herein in its entirety.

TECHNICAL FIELD

The present description relates generally to processing audio signals, including processing audio signals with respect to detecting and/or enhancing user speech.

BACKGROUND

An electronic device may include multiple microphones. The multiple microphones may produce audio signals which include sound from a source, such as a user speaking to the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
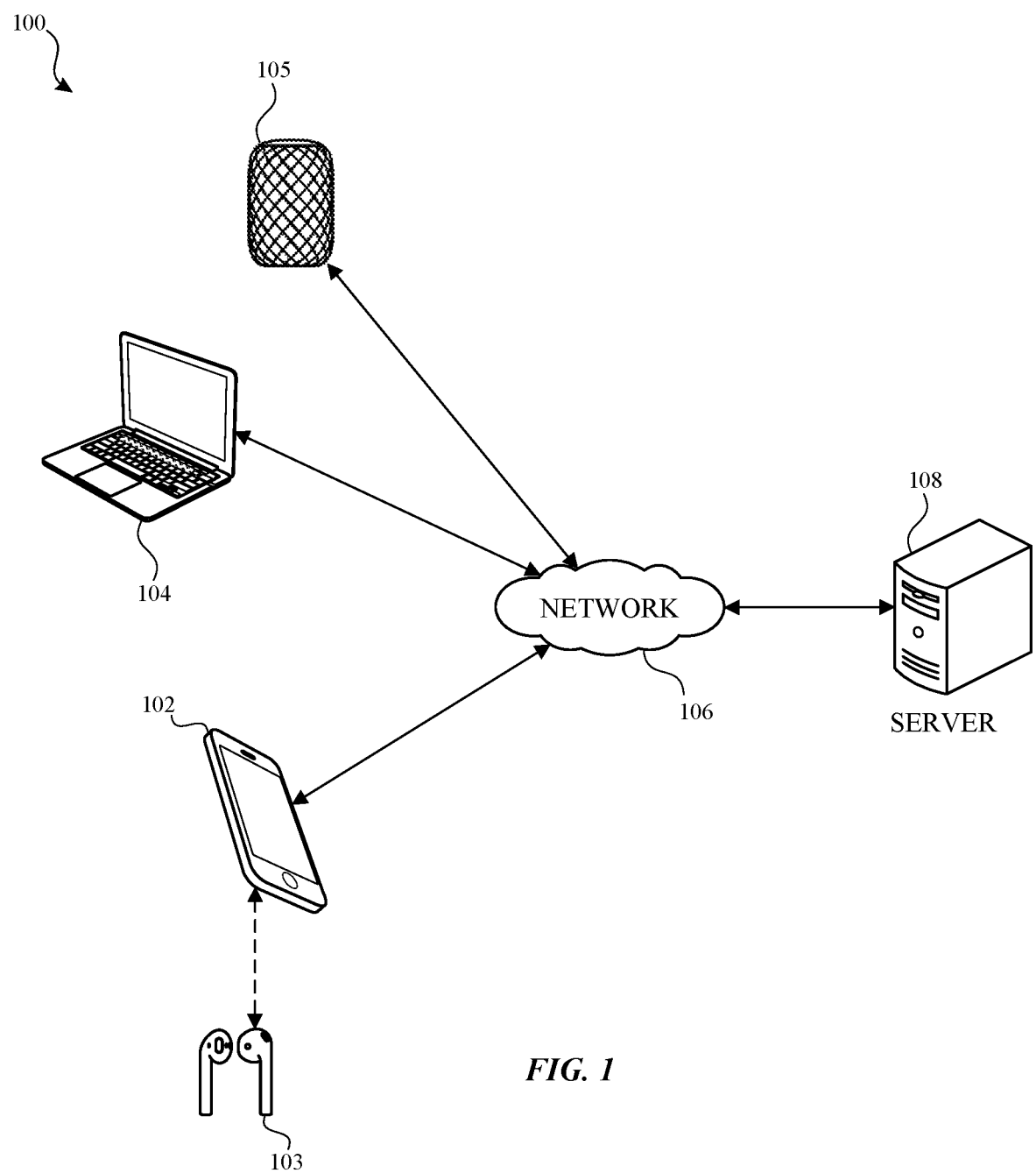
FIG. 1 illustrates an example network environment for spatially informed audio signal processing for user speech in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may include multiple microphones. The microphones may produce audio signals, which may contain sounds from one or more sound sources. For example, the sound sources may include one or more of a user who is speaking to the device, a bystander who is not the user of the device but whose voice may be captured by device microphones, and/or environmental noise (e.g., wind, traffic, and the like). Thus, there may be a variety of acoustic environmental conditions that may interfere with a speech signal that is captured up by device microphone(s). The environmental conditions may interfere with real-time applications such as voice trigger phrase detection, hands free telephony, and automatic speech recognition that may be performed by processing a speech signal.

The subject system provides for enhancing speech detection and/or output based on audio signals captured by device microphones. For example, the subject system may employ a machine learning model and/or a spatial probability model in determining whether a received audio signal (e.g., as provided by device microphones) corresponds to a voice of the user of the device. The machine learning model may have been trained with spectro-temporal data in order to detect the presence of speech in audio signals, and may be configured to output a confidence score with respect to whether a speech source is present in the audio signal. The spatial probability model may be configured to divide audio signals into multiple frequency subbands and determine, for each subband, whether an estimated location of the sound source corresponds to an expected position of the user (e.g., of the user's mouth). By using these models in conjunction with one another, it is possible for the device to enhance speech detection and/or output, for example, to improve voice trigger phrase detection, hands free telephony and/or automatic speech recognition.

In addition to employing a machine learning model and/or a spatial probability model, the subject system may further analyze non-audio signals captured by other device sensor(s) (e.g., device camera(s) or radar sensor(s)). The analysis of the non-audio signals may be used to supplement estimates associated with audio signal(s), to further enhance speech detection and/or output. For example, image detection may be performed on image data captured by a device camera, to estimate user (e.g., or the user's mouth) presence and/or position. In another example, analysis of radio wave signal(s) provided by a device radar sensor may be used to detect user presence, user activity (e.g., breath) and/or user position. The information provided by the non-audio signals may be used in conjunction with one or more of the estimates provided by the spatial probability model and/or machine learning model, for enhanced speech detection and/or output.

FIG. 1 illustrates an example network environment for processing audio signals to enhance speech output in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, 104 and 105, a wireless audio input/output device 103, a network 106, and a server 108. The network 106 may communicatively (directly or indirectly) couple, for example, one or more of the electronic devices 102, 104, 105 and/or the server 108. In FIG. 1, the wireless audio input/output device 103 is illustrated as not being directly coupled to the network 106; however, in one or more implementations, the wireless audio input/output device 103 may be directly coupled to the network 106.

The network 106 may be an interconnected network of devices that may include, or may be communicatively coupled to, the Internet. In one or more implementations, connections over the network 106 may be referred to as wide area network connections, while connections between the electronic device 102 and the wireless audio input/output device 103 may be referred to as peer-to-peer connections. For explanatory purposes, the network environment 100 is illustrated in FIG. 1 as including three electronic devices 102, 104 and 105, a single wireless audio input/output device 103, and a single server 108; however, the network environment 100 may include any number of electronic devices, wireless audio input/output devices and/or servers.

The server 108 may be, and/or may include all or part of the electronic system discussed below with respect to FIG. 8. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers.

Each of the electronic devices 102, 104, 105 may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic device 102 is depicted as a smartphone, the electronic device 104 is depicted as a laptop computer, and the electronic device 105 is depicted as a smart speaker. Each of the electronic devices 102, 104 and 105 may be, and/or may include all or part of, the electronic device discussed below with respect to FIG. 2, and/or the electronic system discussed below with respect to FIG. 8.

The wireless audio input/output device 103 may be, for example, a wireless headset device, wireless headphones, one or more wireless earbuds (or any in-ear, against the ear or over-the-ear device), a smart speaker, or generally any device that includes audio input circuitry (e.g., a microphone) and/or one or more wireless interfaces, such as near-field communication (NFC) radios, WLAN radios, Bluetooth radios, Zigbee radios, and/or other wireless radios. In FIG. 1, by way of example, the wireless audio input/output device 103 is depicted as a set of wireless earbuds.

As is discussed further below, one or more of the electronic devices 102, 104, 105 and/or the wireless audio input/output device 103 may include one or more microphones that may be used, in conjunction with the architectures/components described herein, for enhanced speech output. The wireless audio input/output device 103 may be, and/or may include all or part of, the wireless audio input/output device discussed below with respect to FIG. 2, and/or the electronic system discussed below with respect to FIG. 8.

In one or more implementations, the wireless audio input/output device 103 may be paired, such as via Bluetooth, with the electronic device 102 (e.g., or with one of the electronic devices 104-105). After the two devices 102 and 103 are paired together, the devices 102 and 103 may automatically form a secure peer-to-peer connection when located proximate to one another, such as within Bluetooth communication range of one another. The electronic device 102 may stream audio, such as music, phone calls, and the like, to the wireless audio input/output device 103. For explanatory purposes, the subject technology is described herein with respect to a wireless connection between the electronic device 102 and the wireless audio input/output device 103. However, the subject technology can also be applied to a wired a connection between the electronic device 102 and input/output devices.

Figure 2:
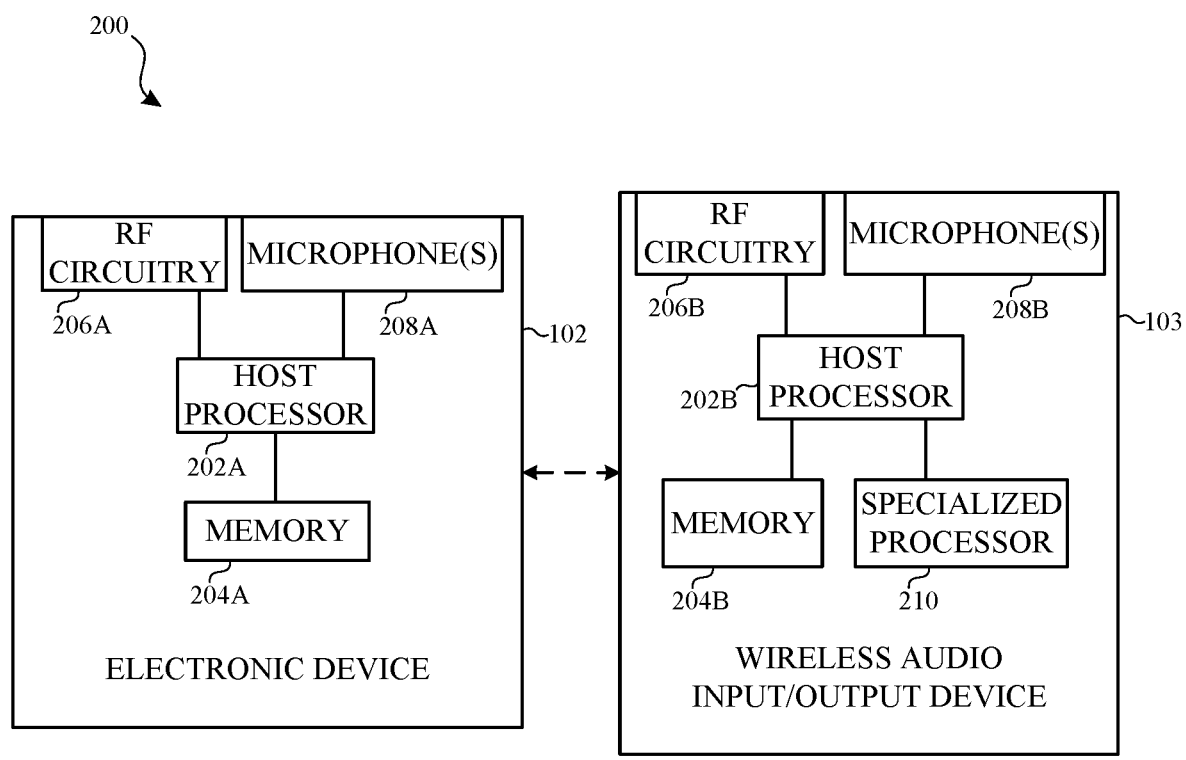
FIG. 2 illustrates an example network environment including an example electronic device and an example wireless audio input/output device in accordance with one or more implementations.

FIG. 2 illustrates an example network environment including an example electronic device and an example wireless audio input/output device in accordance with one or more implementations. The electronic device 102 is depicted in FIG. 2 for explanatory purposes; however, one or more of the components of the electronic device 102 may also be implemented by other electronic device(s) (e.g., one or more of the electronic devices 104-105). Similarly, the wireless audio input/output device 103 is depicted in FIG. 2 for explanatory purposes; however, one or more of the components of the wireless audio input/output device 103 may also be implemented by other device(s) (e.g., a headset and/or headphones). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202A, a memory 204A, radio frequency (RF) circuitry 206A and/or one more one more microphone(s) 208A. The wireless audio input/output device 103 may include one or more processors, such as a host processor 202B and/or a specialized processor 210. The wireless audio input/output device 103 may further include a memory 204B, RF circuitry 206B and/or one or more microphone(s) 208B. While the network environment 200 illustrates microphone(s) 208A-B, it is possible for other types of a sensor(s) to be used instead of, or addition to, microphone(s) (e.g., other types of sound sensor(s), an accelerometer, and the like).

The RF circuitries 206A-B may include one or more antennas and one or more transceivers for transmitting/receiving RF communications, such as WiFi, Bluetooth, cellular, and the like. In one or more implementations, the RF circuitry 206A of the electronic device 102 may include circuitry for forming wide area network connections and peer-to-peer connections, such as WiFi, Bluetooth, and/or cellular circuitry, while the RF circuitry 206B of the wireless audio input/output device 103 may include Bluetooth, WiFi, and/or other circuitry for forming peer-to-peer connections.

The host processors 202A-B may include suitable logic, circuitry, and/or code that enable processing data and/or controlling operations of the electronic device 102 and the wireless audio input/output device 103, respectively. In this regard, the host processors 202A-B may be enabled to provide control signals to various other components of the electronic device 102 and the wireless audio input/output device 103, respectively. Additionally, the host processors 202A-B may enable implementation of an operating system or may otherwise execute code to manage operations of the electronic device 102 and the wireless audio input/output device 103, respectively. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

In one or more implementations, a given electronic device, such as the wireless audio input/output device 103, may include a specialized processor (e.g., the specialized processor 210) that may be always powered on and/or in an active mode, e.g., even when a host/application processor (e.g., the host processor 202B) of the device is in a low power mode or in an instance where such an electronic device does not include a host/application processor (e.g., a CPU and/or GPU). Such a specialized processor may be a low computing power processor that is engineered to utilize less energy than the CPU or GPU, and also is designed, in an example, to be running continuously on the electronic device in order to collect audio and/or sensor data. In an example, such a specialized processor can be an always on processor (AOP), which may be a small and/or low power auxiliary processor. In one or more implementations, the specialized processor 210 can be a digital signal processor (DSP).

The specialized processor 210 may be implemented as specialized, custom, and/or dedicated hardware, such as a low-power processor that may be always powered on (e.g., to collect and process audio signals provided by the microphone(s) 208B), and may continuously run on the wireless audio input/output device 103. The specialized processor 210 may be utilized to perform certain operations in a more computationally and/or power efficient manner. In an example, the specialized processor 210 may implement a system for enhanced speech output, as described herein. In one or more implementations, the wireless audio input/output device 103 may only include the specialized processor 210 (e.g., exclusive of the host processor 202B).

One or more of the microphone(s) 208A-B may include one or more external microphones, one or more internal microphones, or a combination of external microphone(s) and/or internal microphone(s). As discussed further below with respect to FIGS. 3-5, one or more of the devices 102 and 103 may be configured to implement a system for enhanced speech detection and/or output, where the system processes audio signals provided by the respective one or more microphone(s) 208A or 208B. In one or more implementations, the system for enhanced speech detection and/or output may further be based on signals provided other sensor(s) (e.g., non-audio signals provided by an image sensor and/or a radar sensor).

In one or more implementations, one or more of the host processors 202A-B, the memories 204A-B, the RF circuitries 206A-B, the microphone(s) 208A-B and/or the specialized processor 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
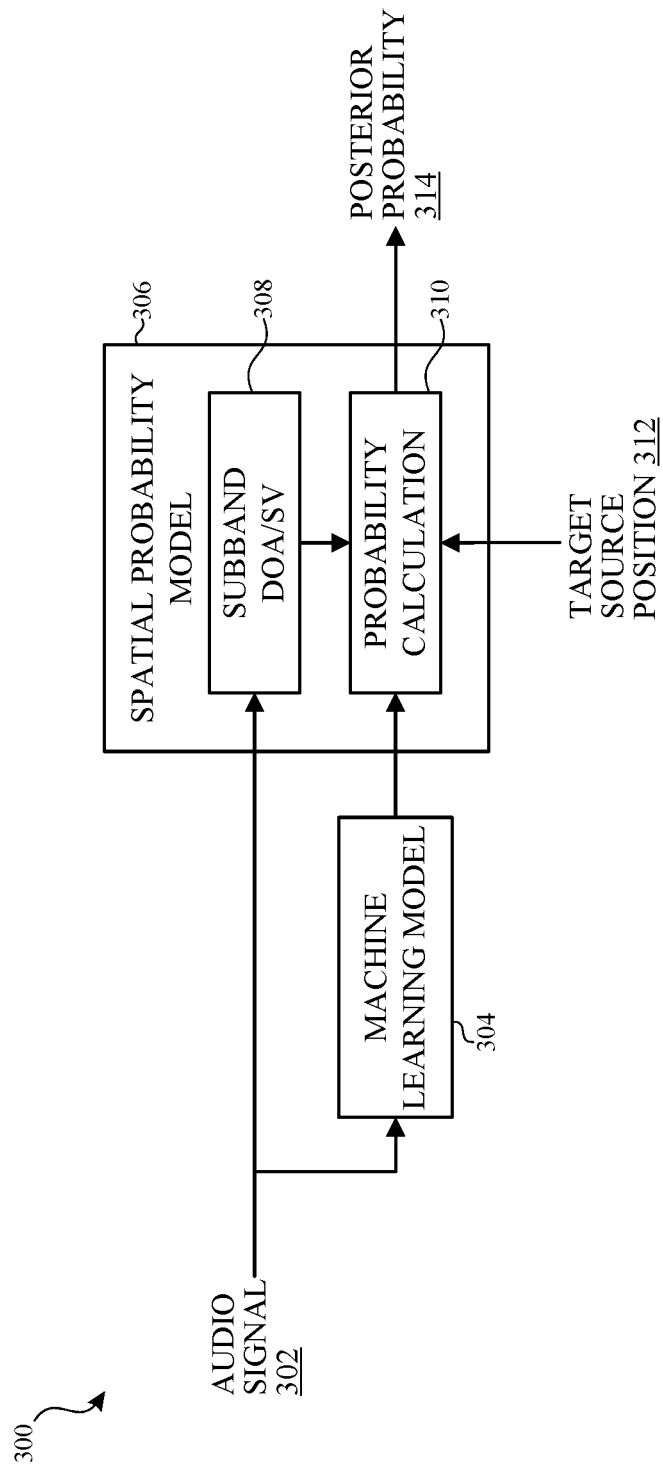
FIG. 3 illustrates a block diagram of an example architecture for estimating the presence of speech in an audio signal in accordance with one or more implementations.

FIG. 3 illustrates a block diagram of an example architecture 300 for estimating the presence of speech in an audio signal in accordance with one or more implementations. For explanatory purposes, the architecture 300 is primarily described herein as being implemented by the electronic device 102 of FIG. 1. However, the architecture 300 is not limited to the electronic device 102 of FIG. 1, and may be implemented may be implemented by one or more other components and other suitable devices (e.g., the wireless audio input/output 103). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 may include a machine learning model 304 and a spatial probability model 306. The spatial probability model 306 may include a subband direction of arrival (DOA)/steering vector (SV) module 308, and a probability calculation module 310. In addition, the architecture 300 may provide for receiving an audio signal 302 and a target source position 312 (e.g., an expected position of the user's mouth) as input, and for outputting a posterior probability 314. For example, the posterior probability 314 may indicate a probability that the dominant audio (e.g., at a time/subband corresponding to the audio signal 302) is human speech and corresponds to the expected location of the mouth of the user of the electronic device 102.

The architecture 300 generally provides for unsupervised probabilistic modeling of spatial information, for example, as implemented by the spatial probability model 306. Given the prior spatial location of the target source position 312 (e.g., an expected position of the user's mouth), the spatial probability model 306 may be configured to capture the speech signal activity, for example, at every frame of a recorded sound field.

In addition, the unsupervised probabilistic modeling may be integrated with the machine learning model 304. Moreover, while the machine learning model 304 and the spatial probability model 306 are illustrated as separate models, the models 304-306 may be implemented as a single model which is configured to perform the functionality described herein with respect to the models 304-306.

In one or more implementations, the audio signal 302 may correspond to a multi-channel signal provided by one or more microphone(s) (e.g., the microphone(s) 208A) of the electronic device 102. In one or more implementations, the audio signal 302 may span a time duration including multiple frames. Moreover, the frames of the audio signal 302 may span multiple audio frequencies, such that the each time frame of the audio signal 302 may be categorized based on respective frequency subbands.

As shown in the example of FIG. 3, the audio signal 302 may be provided as input to both the machine learning model 304 and the spatial probability model 306. In one or more implementations, the machine learning model 304 may be configured to output an estimate (e.g., first confidence score) for whether a speech source is present in the audio signal 302. For example, the machine learning model 304 may correspond to a deep neural network (DNN) (and/or other machine learning model) configured to produce a respective speech presence probability (SPP) value, based on one of more frame(s) of the audio signal 302. The SPP value as provided by the machine learning model 304 may be provided as further input to the spatial probability model 306.

In one or more implementations, the machine learning model 304 may have been trained (e.g., during a training phase) in a supervised manner (e.g., supervised deep learning). For example, the training may have included ground truth training examples and human verification for determining the probability of speech (e.g., the SPP value) for audio signal(s). For example, the machine learning model 304 may be configured to produce an SPP value corresponding to a probability value per frequency subband and per frame (e.g., each millisecond) of the audio signal 302. In this manner, the machine learning model 304 may correspond to a spectro-temporal structure for modeling target speech. In one or more implementations, instead of providing a binary value of 0 or 1, the SPP value provided by the machine learning model 304 may vary in a range between 0 and 1.

As seen in the example of FIG. 3, the spatial probability model 306 is configured to receive one or more values as input, including the audio signal 302, the output provided by the machine learning model (e.g., SPP value), and the target source position 312 (e.g., an expected position of the user's mouth). Based on the received inputs, the spatial probability model 306 may output the posterior probability 314 (e.g., a second confidence score, which is in addition to the first confidence score provided by the machine learning model 304). As noted above, the posterior probability 314 may indicate the probability that the dominant audio (e.g., for a time/subband) corresponds to the presence of speech, and further corresponds to the target source position 312.

In one or implementations, each of the first and second confidence scores (e.g., as respectively provided by the machine learning model 304 and the spatial probability model 306) may correspond to a data structure (e.g., a vector) of scores for each subband and time frame (e.g., millisecond) of the input audio signal. Further, the audio signal 302 may correspond to an audio sample having a fixed length.

In one or more implementations, the target source position 312 (e.g., corresponding to the expected position of the user's mouth) may be predetermined based on prior knowledge of the position of the user's mouth with respect to the electronic device 102. For example, the target source position 312 may be represented by one or more of an azimuth, elevation and/or distance of the target source (e.g., user's mouth) relative to the electronic device 102.

Moreover, one or more sensor(s) (e.g., a motion sensor such as an accelerometer or gyroscope) of the electronic device 102 may provide for estimating the location and/or orientation of the electronic device 102. The expected position of the user's mouth, corresponding to the target source position 312, may be based on the estimated location and/or orientation of the electronic device 102 as provided by the sensor data (e.g., where the position of the mouth is estimated as being within a predefined direction and/or distance of the electronic device 102).

The subband DOA/SV module 308 is configured to divide the audio signal 302 into multiple subbands, for example, where each subband corresponds to a predefined frequency range. The subband DOA/SV module 308 is configured to estimate the location of the dominant speech signal in each subband, using a subband localization technique. For example, for each subband and frame of the audio signal 302, the subband DOA/SV module 308 may be configured to determine at least one of a direction of arrival (DOA) or a steering vector (SV), in order to estimate a location of the dominant sound source (e.g., the dominant audio) for the audio signal 302.

In one or more implementations, the DOA may be estimated when multiple microphones (e.g., microphone(s) 208A of the electronic device 102) are available. Moreover, the subband DOA/SV module 308 may be configured to estimate the distance between the electronic device 102 and the dominant sound source, for example, if one or more of: multiple microphone(s)/microphone array(s) are available, alternative sensors (e.g., accelerometers) are available, and/or if device-specific distance estimators are trained.

With respect to the SV estimates, the subband DOA/SV module 308 may implement one or more steering vector-based models, to capture the speech presence probability at the target source position 312 (e.g., the expected position of the user's mouth). The amount of uncertainty around the target source position 312 may be captured and modeled by a distribution spread factor that can be tuned.

In one or more implementations, the steering vector for the target source position 312 to the microphone(s) 208A may be: calculated based on a propagation model from the target source position 312 to the relative locations of the microphone(s) 208A, measured using a sine sweep (e.g., with respect to the frequency subbands), and/or measured using an audio signal recorded from a speaker (e.g., the audio signal 302) at the target source position 312. In addition, the steering vector may be pre-calculated in an offline recording session (e.g., with low background noise) and/or online when a background noise absence detector is available.

Thus, the subband DOA/SV module 308 may provide for estimating the location of the dominant speech signal in each subband of the audio signal 302. Moreover, the subband DOA/SV module 308 may output DOA and SV estimates, which are in turn provided as input to the probability calculation module 310.

As noted above, the probability calculation module 310 may receive inputs from various sources, including the machine learning model 304 (e.g., an SPP value), the subband DOA/SV module 308 (e.g., DOA and/or SV estimates) and/or the target source position 312. Based on these inputs, the probability calculation module 310 may calculate the posterior probability 314, to indicate the probability that the dominant audio (e.g., at a time/subband) includes speech, and further corresponds to the target source position 312.

In one or more implementations, for each time-frequency bin (e.g., in each subband at each millisecond), the probability calculation module 310 may determine how closely the dominant source of audio in that time-frequency bin (e.g., as provided by the subband DOA/SV module 308) coincides with the target source position 312 (e.g., the expected position of the user's mouth), in order to generate a spatial probability that the audio in that time-frequency bin (e.g., for a given subband/millisecond) corresponds to the user of the device. Moreover, the probability calculation module 310 may use the probability that speech is present in the subband at that millisecond (e.g., the SPP value provided by the machine learning model 304) in conjunction with the spatial probability, to determine the posterior probability 314 for that time-frequency bin. Thus, if the spatial probability is high (e.g., the direction is likely coming from the user's mouth), but the SPP value is low (e.g., low probability of speech such as a user coughing), then the posterior probability 314 may be low. Similarly, if the SPP value is high, but the spatial probability is low (e.g., suggesting that the speech corresponds to a bystander and not the user) then the posterior probability 314 may also be low.

As such, the architecture 300 may provide for enhanced speech detection with respect to received audio signal(s). As noted above, the machine learning model 304 (e.g., DNN) may model spectro-temporal information, and be inherently robust with respect to speaker location uncertainties. In addition, the spatial probability model 306 may provide for probabilistic modeling, to further account for speaker location uncertainties.

In one or more implementations, one or more of components of the machine learning model 304, the spatial probability model 306, the subband DOA/SV module 308 and/or the probability calculation module 310 are implemented as software instructions, stored in the memory 204A, which when executed by the host processor 202A, cause the host processor 202A to perform particular function(s).

In one or more implementations, one or more of components of the machine learning model 304, the spatial probability model 306, the subband DOA/SV module 308 and/or the probability calculation module 310 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
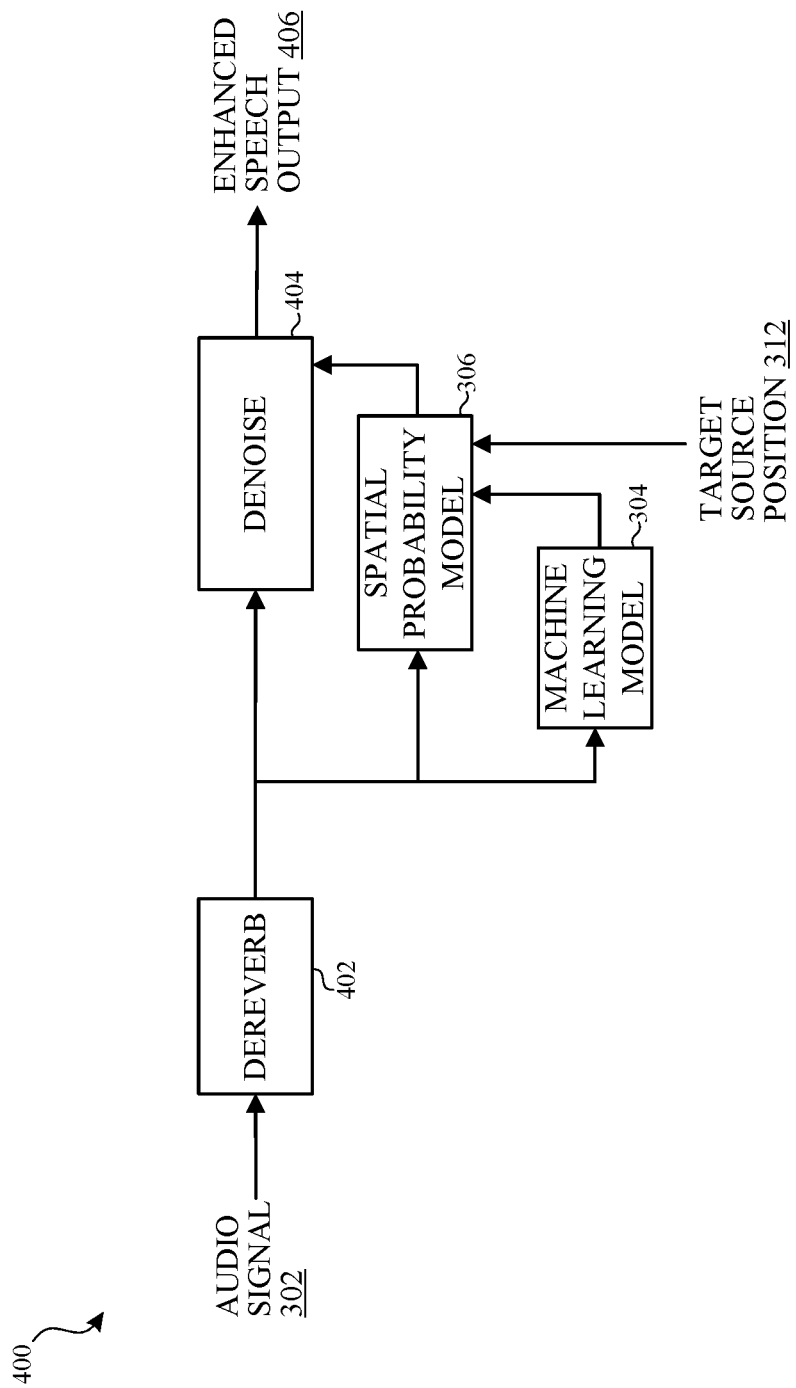
FIG. 4 illustrates a block diagram of an example architecture for processing audio signals to enhance speech output in accordance with one or more implementations.

FIG. 4 illustrates a block diagram of an example architecture 400 for processing audio signals to enhance speech output in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 400 may include the machine learning model 304 and/or the spatial probability model 306 of FIG. 3. The architecture 400 may further include a dereverberation (dereverb) module 402 and a denoise module 404. In addition, the architecture 400 may provide for receiving the audio signal 302 and the target source position 312 as input, and for outputting enhanced speech output 406.

In one or more implementations, the architecture 400 provides for processing audio signals to enhance speech output in which spatial information provided by the spatial probability model 306 is used to guide multichannel target signal extraction and interference suppression. As shown in FIG. 4, the output from the spatial probability model 306 (e.g., the posterior probability 314 of FIG. 3) is provided as input to the denoise module 404, which may use the posterior probability 314 for multichannel target signal extraction and interference suppression.

As noted above with respect to FIG. 3, the spatial probability model 306 may be configured to estimate an SPP value and posterior probability for each time period (e.g., millisecond) and subband. In one or more implementations, the denoise module 404 may be configured to receive the posterior probability value(s) for each time-frequency bin. If the posterior probability value is low (e.g., does not meet a threshold value, suggesting that the audio in that time-frequency bin is not likely the user), the denoise module 404 may filter out the audio. However, if the posterior probability value (and/or SPP value) for the time-frequency bin is high (e.g., meets the threshold value) the denoise module 404 may determine that the audio is likely from the user and may not filter out the audio.

In one or more implementations, the prior knowledge of the target source position 312 is not enforced in the noise reduction filter design (e.g., the denoise module 404), but rather embedded into an external speech presence probability (e.g., the posterior probability 314), which may guide the estimation of desired and undesired signal statistics. Moreover, the amount of uncertainty around the target source position 312 may be captured and modeled by a distribution spread factor (e.g., as discussed above with respect to the spatial probability model 306 of FIG. 3), for improved flexibility.

In one or more implementations, as discussed above with reference to FIG. 3, the machine learning model 304 may be used in conjunction with the spatial probability model 306, to confirm whether the spectro-temporal component(s) correspond to the target source (e.g., the user's mouth).

The architecture 400 further includes the dereverb module 402. In one or more implementations, the dereverb module 402 may provide for minimizing mismatches between the actual (e.g., observation) and hypothesized (e.g., centroid) features of the target source position 312. In addition, the dereverb module 402 may be configured to shorten the acoustic channels (e.g., of the audio signal 302), for example, to facilitate the processing of multichannel audio signal(s) to enhance speech output.

In one or more implementations, one or more of components of the machine learning model 304, the spatial probability model 306, the dereverb module 402 and/or the denoise module 404 are implemented as software instructions, stored in the memory 204A, which when executed by the host processor 202A, cause the host processor 202A to perform particular function(s).

In one or more implementations, one or more of components of the machine learning model 304, the spatial probability model 306, the dereverb module 402 and/or the denoise module 404 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
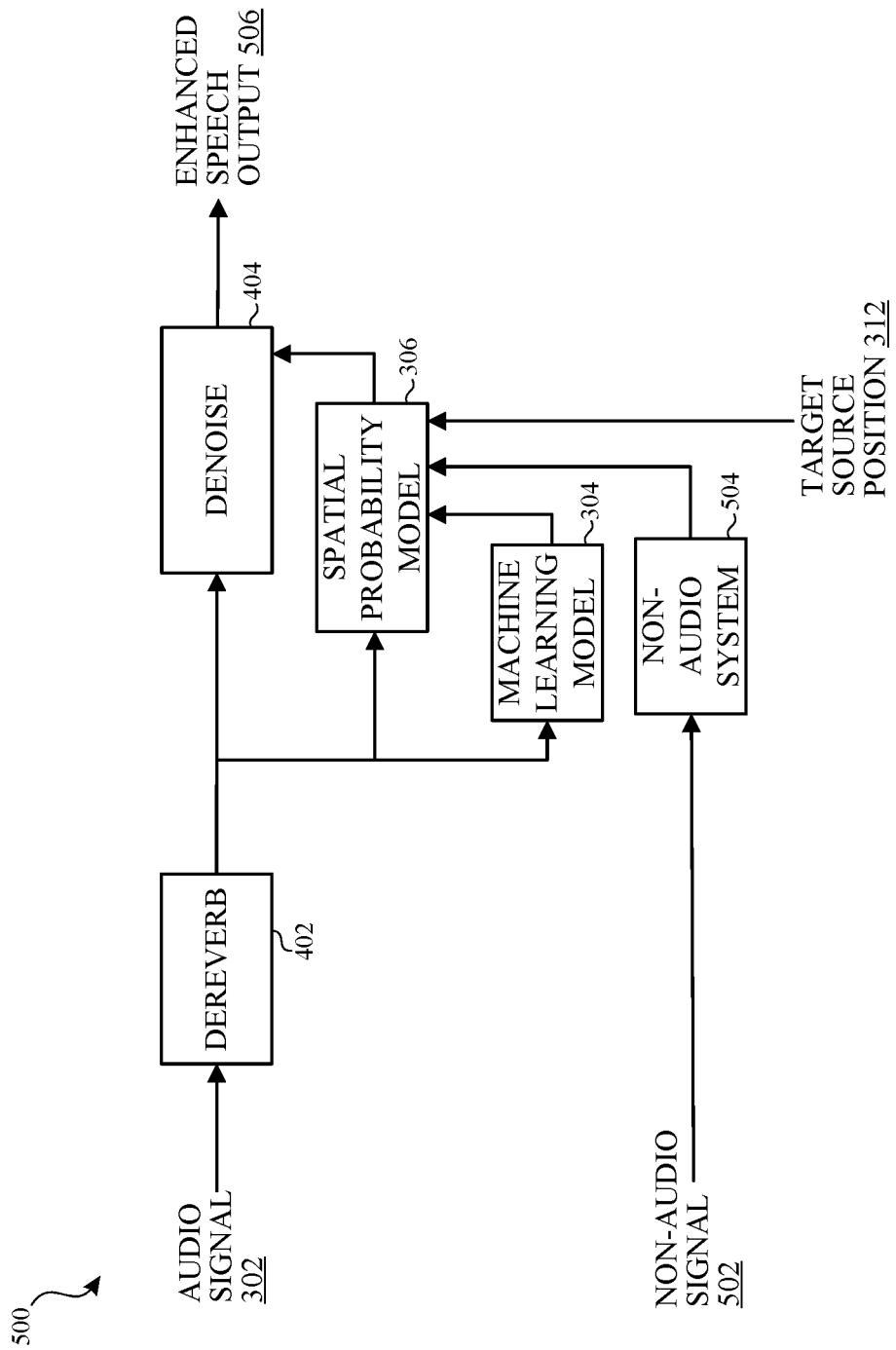
FIG. 5 illustrates a block diagram of another example architecture for processing audio signals to enhance speech output in accordance with one or more implementations.

FIG. 5 illustrates a block diagram of another example architecture 500 for processing audio signals to enhance speech output in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 500 may include the machine learning model 304 and/or the spatial probability model 306 of FIG. 3, and/or the dereverb module 402 and the denoise module 404 of FIG. 4. Relative to the architecture 400 of FIG. 4, the architecture 500 may further include a non-audio system module 504. As shown in the example of FIG. 5, the architecture 500 may provide for receiving the audio signal 302 and the target source position 312 as input, and for outputting enhanced speech output 506.

As described above with respect to FIGS. 3-4, the spatial probability model 306 may be configured to estimate an SPP value and posterior probability for each time period (e.g., millisecond) and subband, and the denoise module 404 may be configured to receive the posterior probability value(s) for each time-frequency bin to filter out audio that does not correspond to the user of the electronic device 102. The architecture 500 further provides for an alternative and/or supplemental modality corresponding to non-acoustic signals (e.g., the non-audio signal 502) which can be used to enhance speech output.

As shown in the example of FIG. 5, the non-audio system module 504 is configured to receive a non-audio signal 502 as input, and to output estimated positional information (e.g., coordinates) of the target source (e.g., the user's mouth). The output of the non-audio system module 504 may be provided as input to the spatial probability model 306, which can process this information in conjunction with other inputs (e.g., the audio signal 302, the target source position 312 and/or output from the machine learning model 304) to determine the posterior probability 314 for providing to the denoise module 404. In this instance, the spatial probability model 306 may be further trained using various non-audio signals.

In one or more implementations, the non-audio system module 504 may be associated with an image sensor system, such that the non-audio system module 504 is configured to receive image data (e.g., provided by device camera(s)) as the non-audio signal 502. The image data may correspond to photos and/or video captured by the device camera(s). The non-audio system module 504 may be configured to estimate positional information (e.g., coordinates) of the target source (e.g., the user's mouth/lips) based on using image detection technique(s) for identifying the presence, position and/or distance of the user (e.g., and/or the user's mouth) based on the captured image(s). For example, the positional information coordinates may correspond to azimuth, elevation, distance and/or XYZ coordinates.

Alternatively or in addition, the non-audio system module 504 may be associated with a radar system, such that the non-audio system module 504 is configured to receive radio wave signal(s) (e.g., provided by device radar sensor(s)) as the non-audio signal 502. The non-audio system module 504 may be configured to estimate positional information (e.g., coordinates) of the target source (e.g., the user's mouth) based on analyzing the radio wave signal(s) to detect the presence, position and/or distance of the user's mouth. In another example, the radio wave signal(s) may indicate the presence/position of the user based on detected user activity (e.g., the act of breathing as detected from the radio wave signal(s)).

Thus, in both of the above non-audio system example implementations (e.g., image sensor system and/or radar system), it is possible for the architecture 500 to provide alternative and/or supplemental information for estimating the direction and/or position of the target speech source. For example, the source coordinates provided by the non-audio system module 504 (e.g., image sensor system and/or radar system) may be mapped to a corresponding steering vector model (e.g., corresponding to the subband DOA/SV module 308) of the spatial probability model 306. In one more implementations, the steering vector model estimates may be theoretical or pre-measured/pre-simulated.

The non-audio system module 504 may provide for supplemental target source positioning, to be used in conjunction with other inputs (e.g., the audio signal 302, the target source position 312 and/or output from the machine learning model 304) to the spatial probability model 306. This may improve the posterior probability 314 output by the spatial probability model 306, in order for the denoise module 404 to determine the enhanced speech output 506.

In one or more implementations, one or more of components of the machine learning model 304, the spatial probability model 306, the dereverb module 402, the denoise module 404 and/or the non-audio system module 504 are implemented as software instructions, stored in the memory 204A, which when executed by the host processor 202A, cause the host processor 202A to perform particular function(s).

In one or more implementations, one or more of components of the machine learning model 304, the spatial probability model 306, the dereverb module 402, the denoise module 404 and/or the non-audio system module 504 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
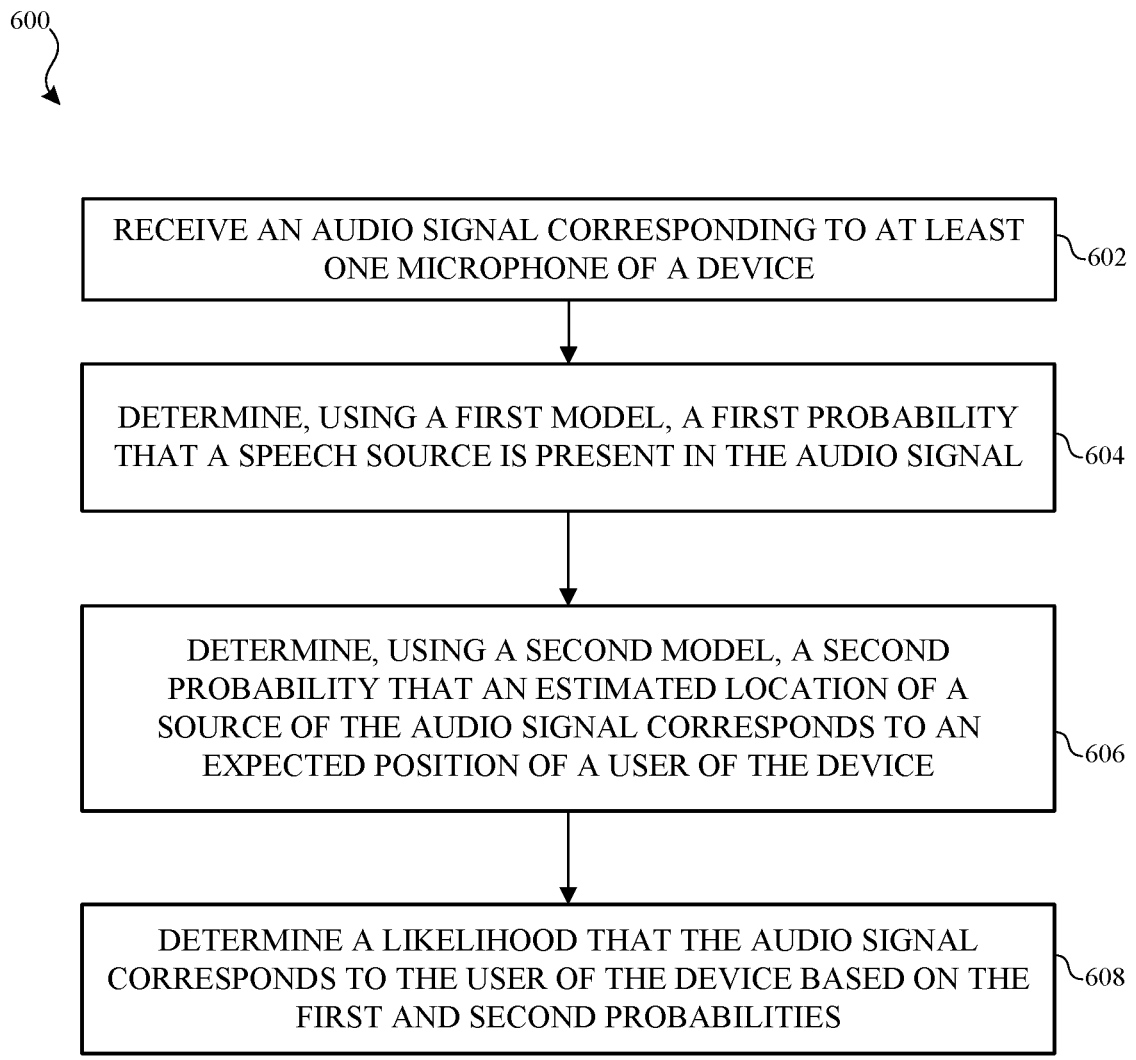
FIG. 6 illustrates a flow diagram of example process for estimating the presence of speech, by a user of a device, in an audio signal in accordance with one or more implementations.

FIG. 6 illustrates a flow diagram of example process for estimating the presence of speech, by a user of a device, in an audio signal in accordance with one or more implementations. For explanatory purposes, the process 600 is primarily described herein with reference to the electronic device 102 of FIG. 1. However, the process 600 is not limited to the electronic device 102 of FIG. 1, and one or more blocks (or operations) of the process 600 may be performed by one or more other components and other suitable devices (e.g., the wireless audio input/output device 103). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 receives an audio signal (e.g., a multi-channel signal) corresponding to at least one microphone of the electronic device 102 (602). The electronic device 102 determines, using a first model, a first probability that a speech source is present in the audio signal (604). The first model may be a machine learning model configured to output the first probability. The machine learning model may be configured to model spectro-temporal properties of speech.

The electronic device 102 determines, using a second model, a second probability that an estimated location of a source of the audio signal corresponds to an expected position of a user of the electronic device 102 (606). The second model may be a spatial probability model configured to output the second probability. The electronic device 102 may divide the audio signal into multiple subbands, and the spatial probability model may be configured to determine the estimated location of the source of the audio signal by performing dominant speech signal analysis on the multiple subbands.

The estimated location of the source of the audio signal may be based on a direction of arrival corresponding to the audio signal. The expected position of the user of the electronic device 102 may correspond to an expected position of a mouth of the user relative to the electronic device 102, based on prior source location information. Each of the first and second probabilities may correspond to a data structure that includes a probability for each subband and time frame of the audio signal. In one or more implementations, the first model and the second model may be included as part of a single model.

The electronic device 102 determines a likelihood that the audio signal corresponds to the user of the electronic device 102 based on the first and second probabilities (608). The electronic device 102 may perform noise reduction for the audio signal based on the likelihood that the audio signal corresponds to the user of the electronic device 102. The electronic device 102 may further perform reverberation reduction of the audio signal prior to performing the noise reduction for the audio signal.

Figure 7:
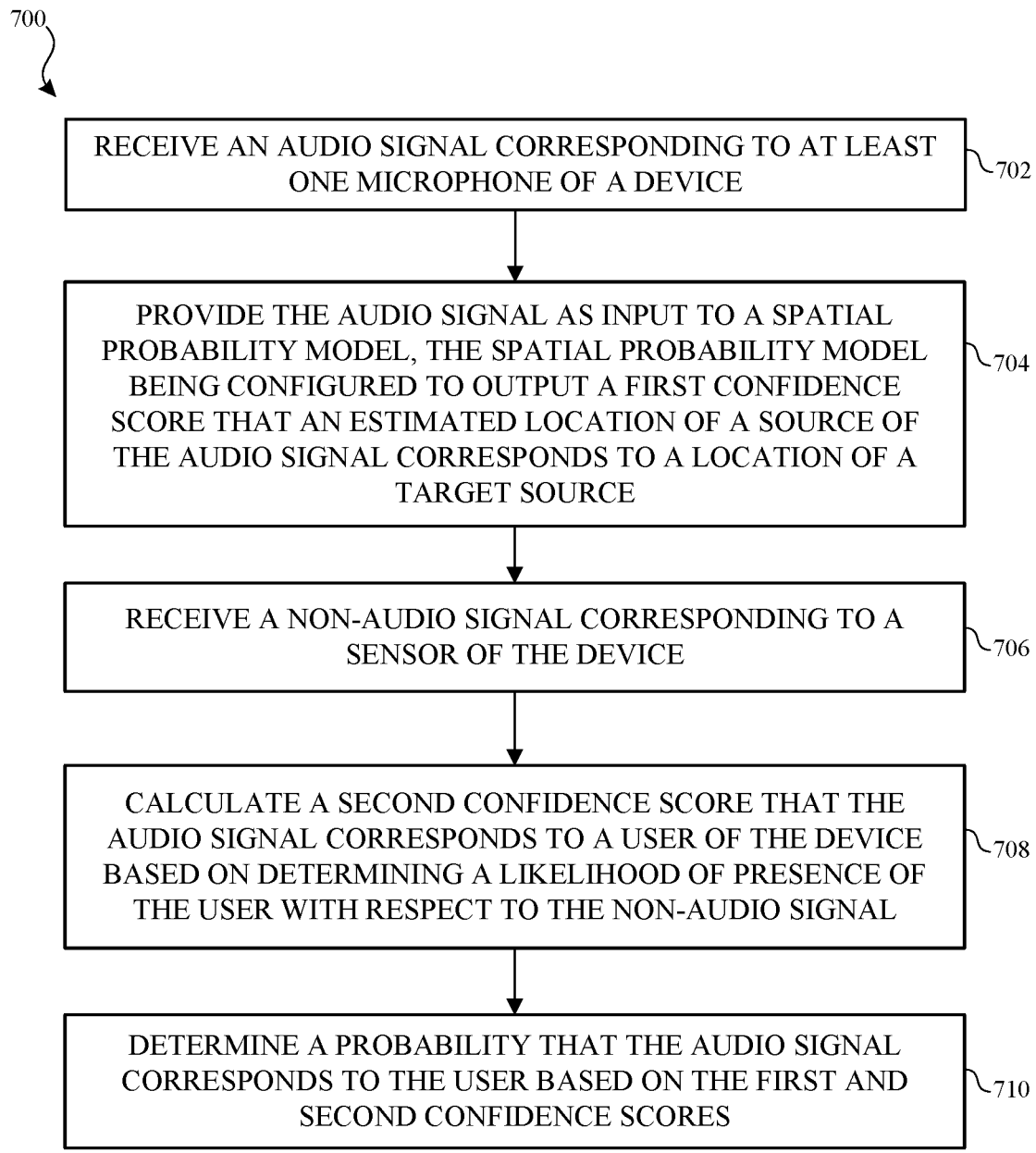
FIG. 7 illustrates a flow diagram of another example process for estimating the presence of speech, by a user of a device, in an audio signal in accordance with one or more implementations.

FIG. 7 illustrates a flow diagram of another example process for estimating the presence of speech, by a user of a device, in an audio signal in accordance with one or more implementations. For explanatory purposes, the process 700 is primarily described herein with reference to the electronic device 102 of FIG. 1. However, the process 700 is not limited to the electronic device 102 of FIG. 1, and one or more blocks (or operations) of the process 700 may be performed by one or more other components and other suitable devices (e.g., the wireless audio input/output device 103). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 receives an audio signal corresponding to the at least one microphone of the device (702). The electronic device 102 provides the audio signal as input to a spatial probability model, the spatial probability model being configured to output a first confidence score that an estimated location of a source of the audio signal corresponds to a location of a target source, the location of the target source corresponding to an expected position of a user of the device (704).

The electronic device 102 receives a non-audio signal corresponding to a sensor of the device (706). The electronic device 102 calculates a second confidence score that the audio signal corresponds to the user of the device based on determining an estimated location of the user based on the non-audio signal (708).

The sensor may be an image sensor and the non-audio signal may be an image. Determining the estimated location of the user based on the non-audio signal may correspond to detecting a mouth of the user in the image. Alternatively or in addition, the sensor may be a radar sensor and the non-audio signal may be a radio wave signal. Determining the estimated location of the user based on the non-audio signal may correspond to determining the estimation location of the user based on the radio wave signal.

The electronic device 102 determines a probability that the audio signal corresponds to the user based on the first and second confidence scores (710). The electronic device 102 may provide the audio signal as input to a machine learning model, the machine learning model being configured to output a third confidence score that a speech source is present in the audio signal. Determining the probability that the audio signal corresponds to the user may further be based on the third confidence score.

As described above, one aspect of the present technology is the gathering and use of data available from specific and legitimate sources for providing user information in association with processing audio and/or non-audio signals. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing information corresponding to a user in association with processing audio and/or non-audio signals. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing information corresponding to a user in association with processing audio and/or non-audio signals, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
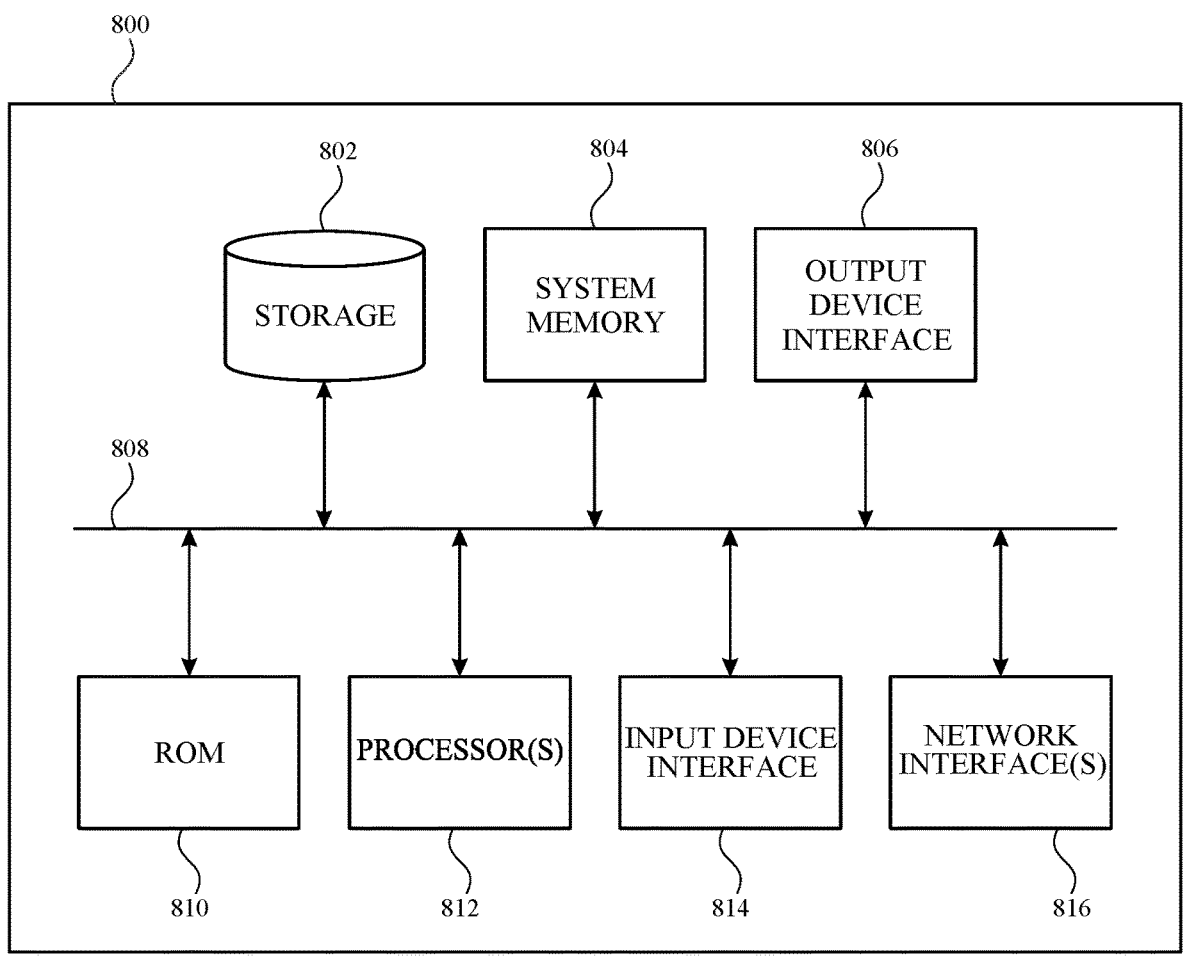
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the devices 102-105, and/or the server 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 108 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving an audio signal corresponding to at least one microphone of a device;
   determining, using a first model and in part by providing the audio signal as an input to the first model, a first probability that a speech source is present in the audio signal;
   determining, using a second model and in part by providing the audio signal and an expected position of a facial feature of a user relative to the device as inputs to the second model, a second probability that an estimated location of a source of the audio signal corresponds to the expected position of the facial feature of the user of the device; and
   determining a likelihood that the audio signal corresponds to the user of the device based on both the first and second probabilities.

2. The method of claim 1, wherein the first model is a machine learning model configured to output the first probability.

3. The method of claim 2, wherein the machine learning model is configured to model spectro-temporal properties of speech.

4. The method of claim 1, wherein the second model is a spatial probability model configured to output the second probability.

5. The method of claim 4, further comprising:
   dividing the audio signal into multiple subbands,
   wherein the spatial probability model is configured to determine the estimated location of the source of the audio signal by performing dominant speech signal analysis on the multiple subbands.

6. The method of claim 1, wherein the expected position of the facial feature of the user of the device corresponds to an expected position of a mouth of the user relative to the at least one microphone of the device.

7. The method of claim 1, wherein the estimated location of the source of the audio signal is based on a direction of arrival corresponding to the audio signal.

8. The method of claim 1, wherein each of the first and second probabilities corresponds to a data structure that includes a probability for each subband and time frame of the audio signal.

9. The method of claim 1, further comprising:
   responsive to the likelihood being below a threshold likelihood:
     determine the audio signal is from a source other than the user; and
     filter the audio signal.

10. The method of claim 9, further comprising:
    performing reverberation reduction of the audio signal prior to filtering the audio signal.

11. The method of claim 1, wherein the audio signal comprises a multi-channel signal.

12. The method of claim 1, wherein the first model and the second model are included as part of a single model.

13. A computer program product comprising code, stored in a non-transitory computer-readable storage medium, the code comprising:
    code to receive an audio signal corresponding to at least one microphone of a device;
    code to determine, using a first model and in part by providing the audio signal as an input to the first model, a first probability that a speech source is present in the audio signal;
    code to determine, using a second model and in part by providing the audio signal and an expected position of a mouth of a user relative to the at least one microphone of the device as inputs to the second model, a second probability that an estimated location of a source of the audio signal corresponds to the expected position of the mouth of the user of the device; and
    code to determine a likelihood that the audio signal corresponds to the user of the device based on both the first and second probabilities.

14. The computer program product of claim 13, wherein the first model is a machine learning model configured to output the first probability.

15. The computer program product of claim 14, wherein the machine learning model is configured to model spectro-temporal properties of speech.

16. The computer program product of claim 15, wherein the second model is a spatial probability model configured to output the second probability.

17. A device comprising:
    at least one microphone;
    at least one processor; and
    a memory including instructions that, when executed by the at least one processor, cause the at least one processor to:
      receive an audio signal corresponding to the at least one microphone of the device;
      provide the audio signal and a location of a target source as inputs to a spatial probability model, the spatial probability model being configured to generate an output that indicates whether a location of a source of the audio signal corresponds to the location of the target source, the location of the target source corresponding to an expected position of a user of the device;
      receive a non-audio signal corresponding to a sensor of the device, the non-audio signal comprising position coordinates of the user, the position coordinates based on a coordinate system;

determine an estimated location of the user based on the non-audio signal; and determine a probability that the audio signal corresponds to an identification of the user based on both the output of the spatial probability model and the estimated location of the user based on the non-audio signal.

18. The device of claim 17, wherein the sensor comprises an image sensor and the non-audio signal comprises an image, and wherein determining the estimated location of the user based on the non-audio signal comprises detecting a mouth of the user in the image.

19. The device of claim 17, wherein the sensor comprises a radar sensor and the non-audio signal comprises a radio wave signal, and wherein determining the estimated location of the user based on the non-audio signal comprises determining the estimation location of the user based on the radio wave signal.

20. The device of claim 17, the instructions further causing the at least one processor to:

provide the audio signal as input to a machine learning model, the machine learning model being configured to generate an output that indicates whether a speech source is present in the audio signal, wherein determining the probability that the audio signal corresponds to the user is further based on the output of the machine learning model.

* * * * *